United States Patent [19]
Frank et al.

[11] Patent Number: 6,068,238
[45] Date of Patent: May 30, 2000

[54] VALVE ASSEMBLY WITH AUTOMATIC SAMPLING SYSTEM

[76] Inventors: Wolfgang J. Frank, 486 Long Point Rd., Mt. Pleasant, S.C. 29464; Martin Wilhelm Frank, SchuF-Armaturen, Farbenstrasse 96, Frankfurt am Main, D-65931, Germany

[21] Appl. No.: 09/050,449

[22] Filed: Mar. 30, 1998

[51] Int. Cl.[7] .................................................. F16K 31/363
[52] U.S. Cl. ...................... 251/144; 251/63.6; 73/863.86
[58] Field of Search ............................... 251/144, 62, 63, 251/63.5, 63.6, 210; 137/861, 872; 73/863.81, 863.86

[56] References Cited

U.S. PATENT DOCUMENTS

| | | |
|---|---|---|
| 1,205,619 | 11/1916 | Hanson ................................ 251/144 X |
| 3,417,960 | 12/1968 | Stehlin ................................. 251/144 X |
| 3,561,274 | 2/1971 | Haunschild . |
| 3,949,963 | 4/1976 | Aoki .................................... 251/144 X |
| 4,405,561 | 9/1983 | Neale et al. . |
| 4,464,340 | 8/1984 | Lennox, Jr. et al. . |
| 4,852,412 | 8/1989 | Hill . |
| 5,296,197 | 3/1994 | Newberg et al. . |

OTHER PUBLICATIONS

Brochures, 2, SchuF, Inc. (attached).

*Primary Examiner*—Kevin Lee
*Attorney, Agent, or Firm*—Harleston Law Firm; Kathleen M. Harleston

[57] ABSTRACT

An apparatus for sampling and draining media from a vessel or reactor is described. The apparatus comprises: (a) a valve body with a generally longitudinal axis extending therethrough; (b) a moveable disc assembly positioned within a central channel of the valve body; (c) a valve operating rod extending within the valve body along its longitudinal axis; (d) a piston actuator assembly for positioning the disc assembly along the central channel; and (e) a sampling port extending away from the valve body. The valve body comprises the central channel, which has an upper end communicable with a port in the wall of the vessel or reactor and a side outlet which extends away from the longitudinal axis of the valve body. The valve operating rod has an upper end which is communicable with the disc assembly. The piston actuator assembly is communicable with an opposite, lower end of the valve operating rod.

12 Claims, 5 Drawing Sheets

VALVE ASSEMBLY WITH AUTOMATIC SAMPLING SYSTEM

CROSS REFERENCE TO RELATED APPLICATIONS

Not Applicable.

STATEMENT REGARDING FEDERALLY SPONSORED RESEARCH OR DEVELOPMENT

Not Applicable

REFERENCE TO A MICROFICHE APPENDIX

Not Applicable.

BACKGROUND OF THE INVENTION

1. Technical Field

The present apparatus is a disc-valve assembly with an automated sampling system for use in vessels and reactors, more particularly an automatic draining, crust breaking and sampling apparatus comprising a disc-type valve.

2. Background Information

Many chemical and pharmaceutical companies produce pharmaceutical intermediates and chemical compositions in reactors, such as glass-lined or stainless steel batch reactors. In the past, batch reactors have been drained through ball or plug valves. This often results in dead space (cavities) at the bottom of the vessel.

During and after the manufacturing process, it is necessary to periodically draw samples from the batch inside the reactor. Traditionally, samples have been drawn through manholes at the top of batch reactors. Unfortunately, this method of sampling can create environmental, safety and contamination problems. For example, chemical leaks or fumes can be released when gases or liquids escape from a reactor manhole which has just been opened. Also, opening the manhole and reaching into the reactor to draw a sample poses a safety risk for the industrial worker. Lastly, the batch can become contaminated or the manufacturing run can be adversely affected when the operator opens the manhole and takes a sample.

The apparatus of the present invention includes a disc-type valve. With the present valve assembly with automatic sampling system, the problem of cavities at the bottom of the reactor does not arise. With this apparatus, any crusts which have formed at the bottom of the reactor during draining can be broken. The present valve assembly also includes an automated sampling system, which eliminates the problems associated with the old manhole method of sampling a batch.

The apparatus of the present invention can be used for crust breaking, sampling, and draining of batch reactors and the like. It has four positions that can be employed by the batch operator as desired: 1) open position for draining the reactor, 2) closed position for shutting off the opening between the apparatus and the reactor, 3) crust breaking position for breaking any crusts which may have formed at the bottom of the reactor, and 4) sampling position for taking a small sample of the media. The present invention frees the operator for other tasks because it is automated. In addition, the valve of the present invention has a smooth bore so that the liquids in the reactor flow smoothly through the central channel with minimal interruption.

BRIEF SUMMARY OF THE INVENTION

The present invention is an apparatus for sampling and draining media from a vessel or reactor. The apparatus comprises: (a) a valve body with a generally longitudinal axis extending therethrough; (b) a moveable disc assembly positioned within a central channel of the valve body; (c) a valve operating rod extending within the valve body along its longitudinal axis; (d) a piston actuator assembly for positioning the disc assembly along the central channel; and (e) a sampling port extending away from the valve body. The valve body comprises the central channel, which has an upper end adapted to communicate with a port in the wall of the vessel or reactor and a side outlet which extends away from the longitudinal axis of the valve body. The valve operating rod has an upper end which is communicable with the disc assembly. The piston actuator assembly is communicable with an opposite, lower end of the valve operating rod.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
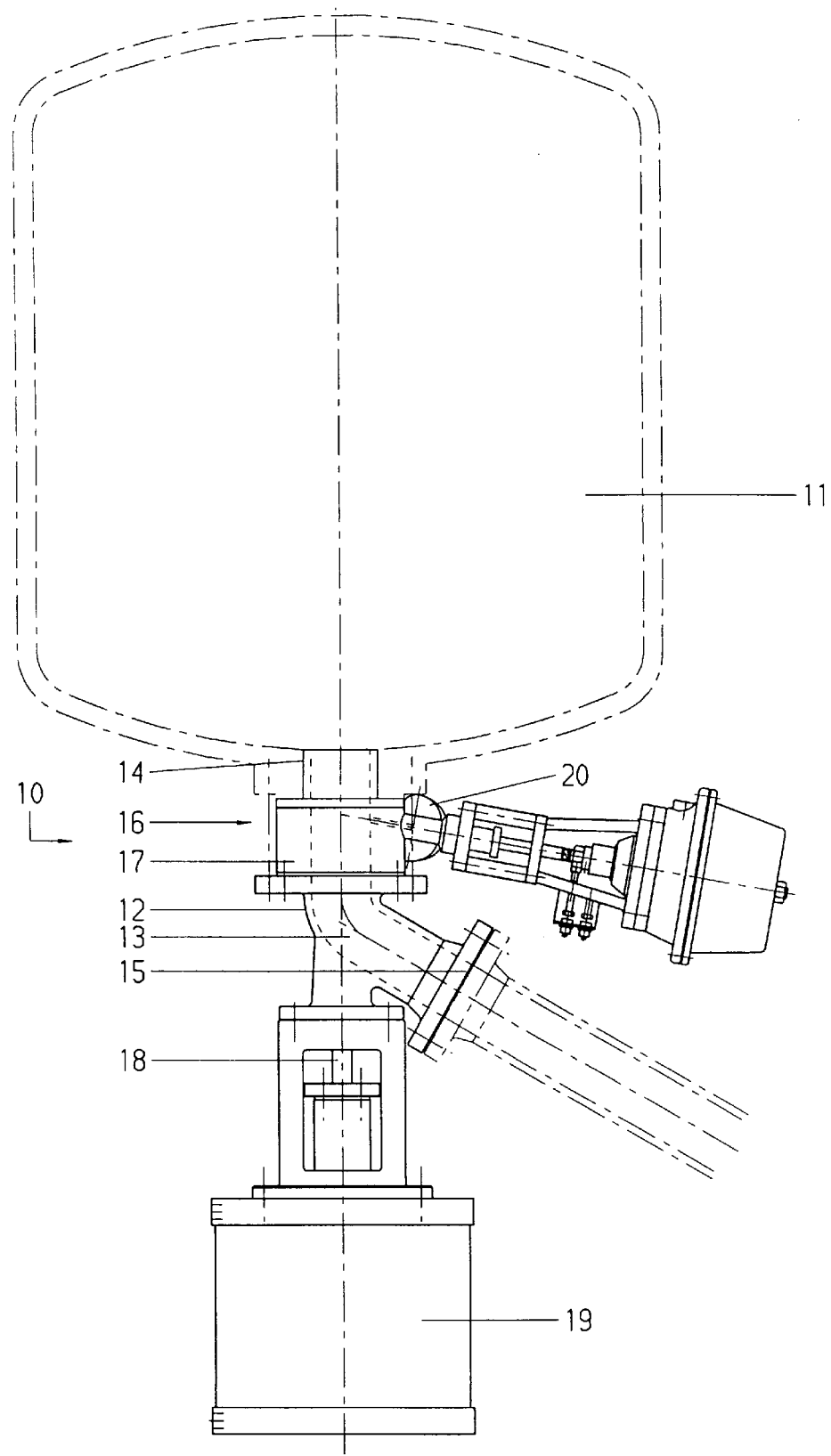
FIG. 1 shows a perspective view of an apparatus according to the present invention affixed to a batch reactor.

In the following description, like reference characters designate like or corresponding parts throughout the several views. Also, in the following description, it is to be understood that such terms as "front", "back," "top," "bottom," "within," and the like are words of convenience and are not to be construed as limiting terms. Referring in more detail to the drawings, the invention will now be described.

Referring to FIG. 1, the apparatus of the present invention 10 is shown attached to the bottom outlet of a batch reactor 11. Although the present assembly 10 is adapted for connection to a batch reactor or another type of reactor or vessel, the reactor or vessel is not a part of the present invention. For purposes of discussion, the present apparatus 10 comprises (a) a valve body 12 with a generally longitudinal axis extending therethrough. The valve body 12 comprises a central channel 13, which has an upper end which is communicable with a port 14 in the wall of the vessel or reactor and a lower end which extends away from the longitudinal axis of the valve body 12. The lower end of the central channel 13 is a side outlet, called the outlet port 15. Media flows from the port at the bottom of the batch reactor down through the central channel 13 of the apparatus 10. When the reactor 11 is drained, media flows down the channel 13 and out the outlet port 15, which is preferably communicable with a mechanism for collecting the drainage from the reactor.

The present apparatus 10 further comprises (b) a disc assembly 16 positioned within the central channel 13 of the valve body 12. The disc assembly 16 comprises a disc 17.

A third element of the present apparatus 10 is (c) a valve operating rod 18 extending within the valve body 12 along its longitudinal axis. The valve operating rod 18 has an upper end which is connected to the top of the disc assembly 16.

The present assembly further comprises (d) a piston actuator assembly 19 for positioning the disc assembly 16 along the central channel 13. The piston actuator assembly 19 is communicable with an opposite, lower end of the valve operating rod 18.

The last element of the present assembly 10 is (e) a sampling port 20 extending away from the valve body 12. The sampling port 20 is communicable at one end with the central channel 13 and at an opposite end with a mechanism for sample collection. Typically, there is a sample container (not shown) removeably affixed to the sample port 20 itself or to a pipe which is affixed to the sample port 20. Once it is full of media, the sample container can be, for example, detached from the sample port and taken to the lab for testing.

Figure 2:
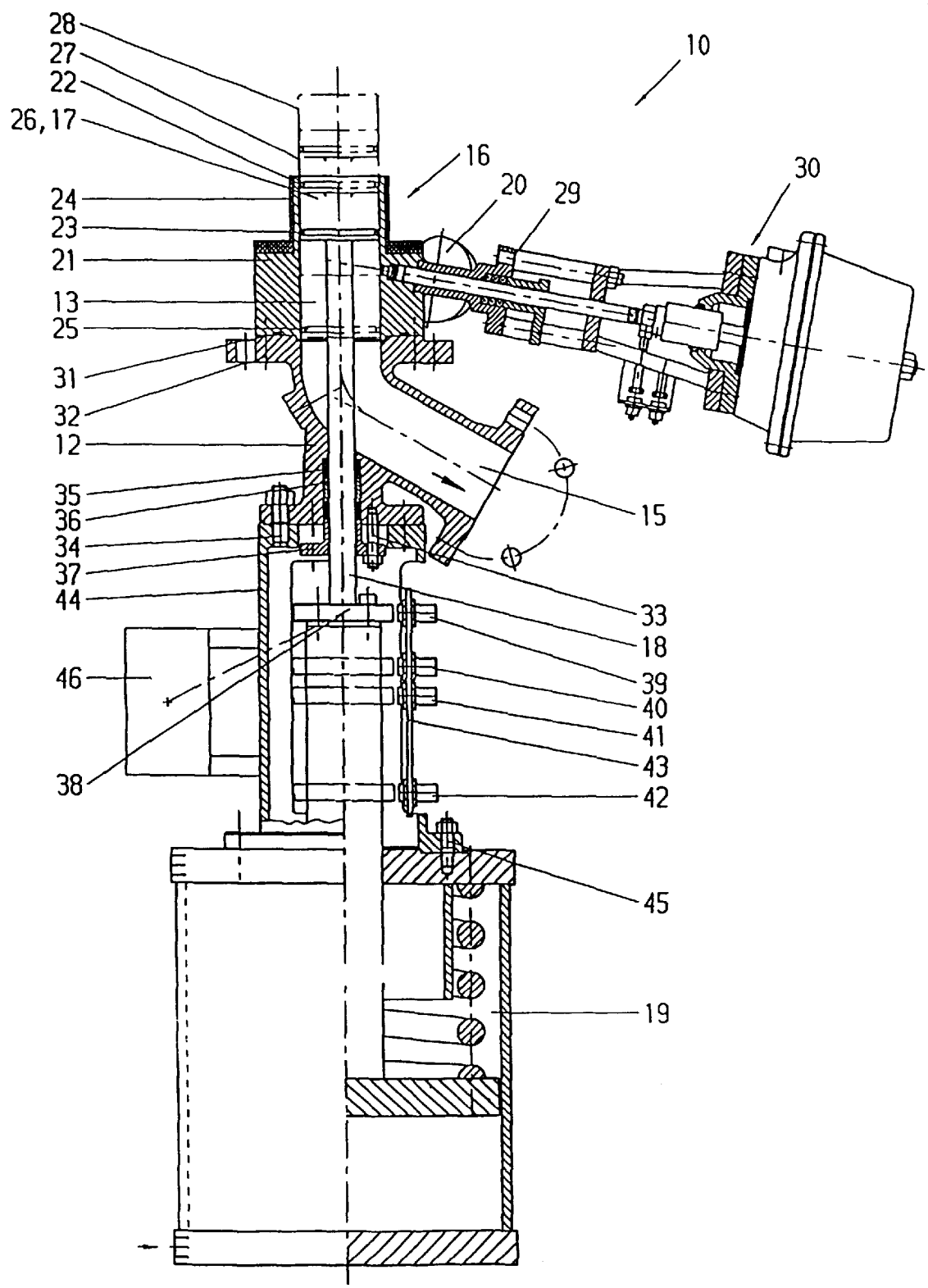
FIG. 2 is a longitudinal cross-section across the approximate center of the apparatus shown in FIG. 1, as viewed from the side of the apparatus.

Referring to FIG. 2, which shows a longitudinal cross-section taken through the approximate center of the present valve apparatus 10, the disc assembly 16 comprises the disc 17 and two sealing rings, preferably O-rings. The disc assembly 16 is contained in a seat 21. One O-ring is the top valve O-ring 22, which is in the top of the disc 17, and the other is the bottom valve O-ring 23, which is in the bottom of the disc 17. Also shown in FIG. 2 is a bushing 24, which protects the glass-lined nozzle of the batch reactor from the metal seat and helps to avoid cavities between the reactor nozzle and the seat 21.

The present invention can automatically carry out several functions. The function that the apparatus 10 carries out at any one time depends upon the level of the disc 17 in the central channel 13. The disc 17 is set in one of four positions, one higher than the next. FIG. 2 shows the various positions of the disc 17. When the disc 17 is at its lowest level, it is in the "sampling" position 25. At this level, the top of the disc 17 is just below the sampling port 20. At this setting, the media is allowed to flow from the reactor through the sampling port 20 into a sample container. The next highest level for the disc 17 is for shutting off the opening between the apparatus and the reactor. This is the "closed" position 26. In the next, "crust breaking" position 27, the disc 17 is slightly higher than it is in the closed position 26. This third position is for breaking any crusts which may have formed at the bottom of the reactor. In the fourth, "open" position 28, the disc 17 is at its highest level and is extended into the batch reactor. This disc position allows the media to drain from the reactor.

When the disc 17 is set in the open position 28, the media from the batch reactor can drain down the central channel 13 and exit via the outlet port 15. From there, it can be collected or routed elsewhere by whatever means the operator has chosen.

When the disc 17 is in the lower, sampling position 25, a sampling valve 29 will open and allow a sample to flow from the batch reactor through the sampling port 20 to a sample container. The sampling port 20 is offset from the sampling valve 29. The sampling valve 29 shares the seat 21 with the disc assembly 16. A pneumatic diaphragm actuator 30 operates the opening and closing of the sampling valve 29.

Below the seat 21 and connecting it to the valve body 12 are a gasket 31 and a stud bolts with hex nuts 32. At the bottom end of the valve body 12 are two stud bolts, each with a hex nut 33, 34. Around the valve operating rod 18 is a packing support ring and packing 35 and a flushing ring 36. Below the flushing ring 36 is a stuffing box 37.

The lower end of the valve operating rod 18 is connected to a limit switch contact plate 38. At its opposite, upper end, the valve operating rod 41 is connected to the disc assembly 16. When the valve operating rod 18 is moved up or down, the disc assembly 16 at its upper end is correspondingly moved up or down. Adjacent to the limit switch contact plate 38 are four proximity limit switches 39–42, which are mounted one below the other on a mounting plate 43. The mounting plate 43 is affixed to a yoke 44. The yoke 44 is attached to the valve body 12 and actuator assembly 19 by means of the stud bolts with hex nuts 33, 34, 45.

When the limit switch contact plate 38 is adjacent to the first proximity limit switch 39, for example, an indicator light goes on in the control room which lets the plant operator know that the disc assembly 16 is in the open position 28. The second proximity limit switch 40 indicates the crust breaking position 27, the third proximity limit switch 41 indicates the closed position 26, and the lowest, fourth proximity limit switch 42 indicates the sampling position 25.

The piston actuator assembly 19 (actuator) is communicable with the lower end of the valve operating rod 18 for positioning the disc assembly 16 along the central channel 13. The position of the disc assembly 16 is controlled automatically via a pneumatic positioner 46. The pneumatic positioner 46 converts electrical or pneumatic signals from a computer and operates the piston actuator assembly 19. On air failure, the disc 17 will move to the sampling position 25.

The typical operation of the automatic draining, sampling, and crust breaking system of the present apparatus 10 is programmed as follows. During the batch reaction, the disc assembly 16 is in the closed position 26. The unique solid disc 17 with the two sealing O-rings 22, 23 and the extended seat 25 substantially eliminate any cavity at the bottom of the reactor.

Step 1: Upon completion of the chemical reaction in the reactor, the disc assembly 16 will be moved to the crust breaking position 27 to break any crusts which may have formed at the bottom of the reactor. The bottom valve O-ring 23 will prevent product from leaking through.

Step 2: Next the disc assembly 16 will move to the sampling position 25. The top valve O-ring 22 is then just below the sampling port 20. The sampling valve 29 will open via its pneumatic diaphragm actuator 30 and allow a sample to flow from the batch reactor to a sample container.

Step 3: The disc assembly 16 will move to the closed position 28 again and the top valve O-ring 23 will push the remaining medium back into the batch reactor.

If the sample taken shows that the chemical reaction in the reactor has not yet been completed, then Steps 1 to 3 will be repeated at a later stage; otherwise the plant operator will proceed to:

Step 4: The disc assembly 16 will move to the open position 28 to drain the reactor.

The timing sequence for the change between disc assembly positions can be changed. Thus, the operator can program any practical sequence of positions, depending upon requirements for the particular chemical reaction taking place in the reactor.

Figure 3:
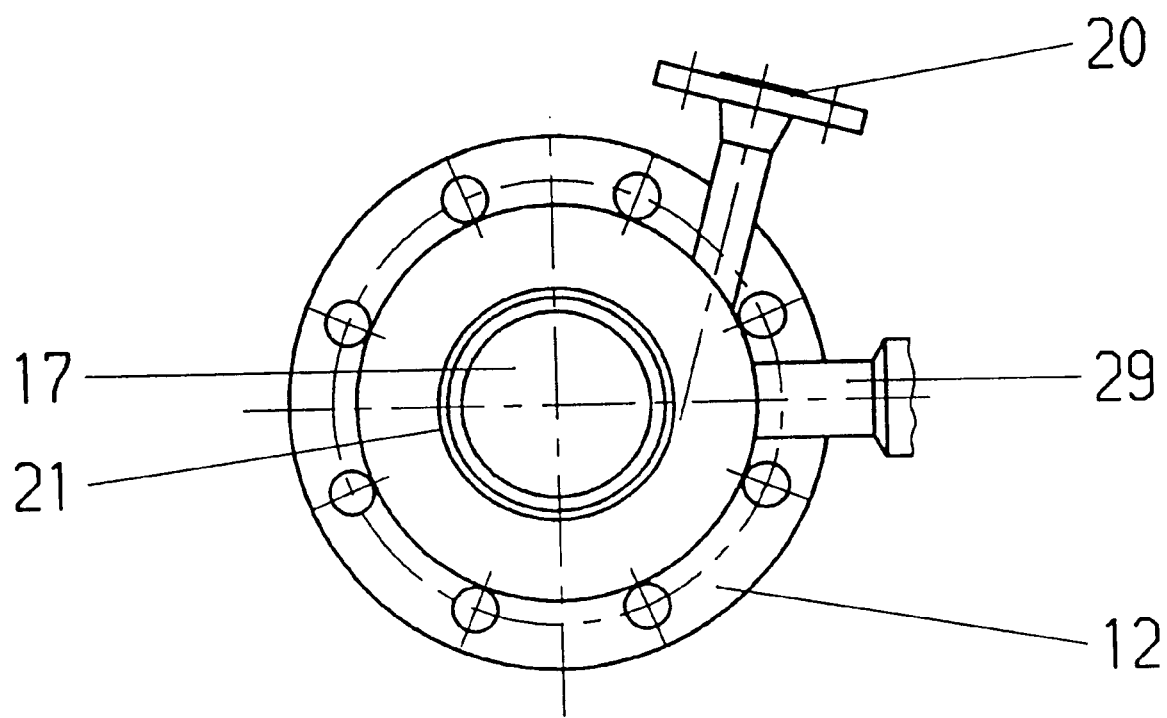
FIG. 3 is a plan view of the apparatus shown in FIG. 1, showing the disc assembly.

Referring to the vertical cross-section of the disc assembly 16 in FIG. 3, the seat 21 holds the circular central disc 17. The orientation of the sampling valve 29 is also shown in FIG. 3. When it is open, the sampling valve 29 allows a sample to flow directly from the central channel 13 where the disc 17 is through the sampling port 20 into a sample container. When the sampling valve 29 is closed, the media will not flow through the sampling port 20.

Figure 4:
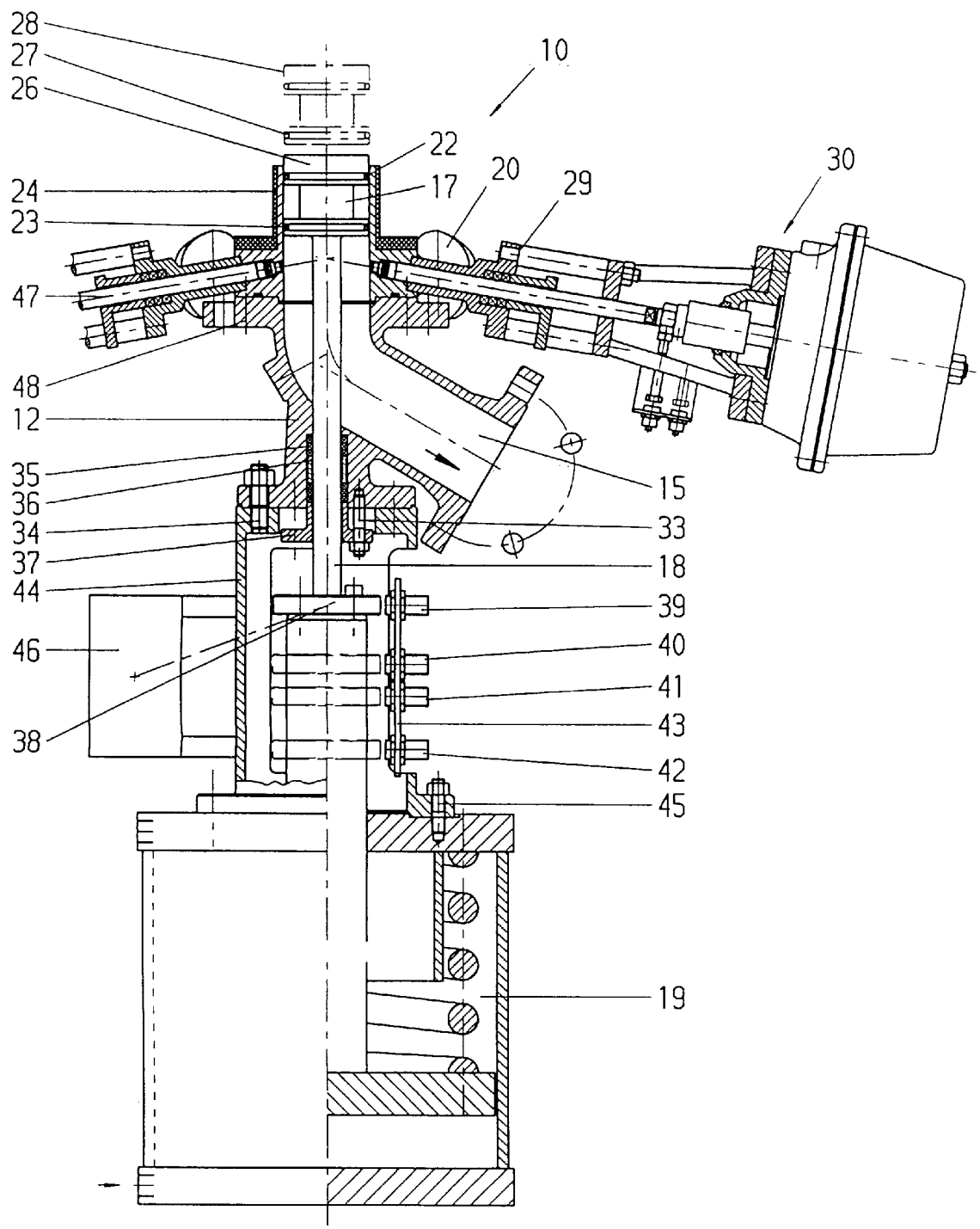
FIG. 4 is a side view of an alternate embodiment of an apparatus according to the present invention.

Like FIG. 2, FIG. 4 is a longitudinal cross-section of the present apparatus 10, but FIG. 4 shows an alternate embodiment. In this embodiment, the disc 17 and the O-rings form a different shape than they form in the embodiment shown in FIG. 2. In the FIG. 2 embodiment, a round sandwich shape is formed with the O-rings on the top and bottom 23, 24 and the disc 17 in the middle. In the FIG. 4 embodiment, a round spool shape is formed with the two O-rings on the top and bottom 23, 24 and a circular disc 17 with a smaller diameter in between. This leaves a space around the circumference of the disc 17, and between the two O-rings, into which media flows when the disc assembly 16 is in the appropriate position. The cavity fills with a specific amount of sample with each sampling cycle. When the disc 17 is in the crust breaking position 27, the disc 17 will pick up the amount of sample that fills the gap between the two O-rings 22, 23 minus the volume of the spindle (not shown) in that area. An advantage is that the disc assembly 16 does not have to move far to the sampling position 27 because the sample is contained in the cavity between the two O-rings 22, 23. However, because the two O-rings 22, 23 seal the sample off from the reactor and from the outlet port 15, there has to be an additional flushing valve 47 to relieve the pressure which has built up in the enclosed cavity and push the sample out (with nitrogen, for example). As the flushing valve 47 exerts force from one side of the apparatus 10, the sampling valve 29 on the opposite side of the apparatus 10 is open to allow the media sample to flow out the sampling port 20. The flushing valve 47 is attached to the seat 21.

To the left of the flushing valve 47 in FIG. 4 is a pneumatic diaphragm actuator which mirrors the pneumatic diaphragm actuator 30 shown to the right of the sampling valve 29 in FIG. 4. The flushing valve 47/pneumatic diaphragm actuator operation is similar to the sampling valve 29/pneumatic diaphragm actuator 30 operation. The pneumatic diaphragm actuator for the flushing valve 47 is not shown in FIG. 4 for space limitation reasons.

Figure 5:
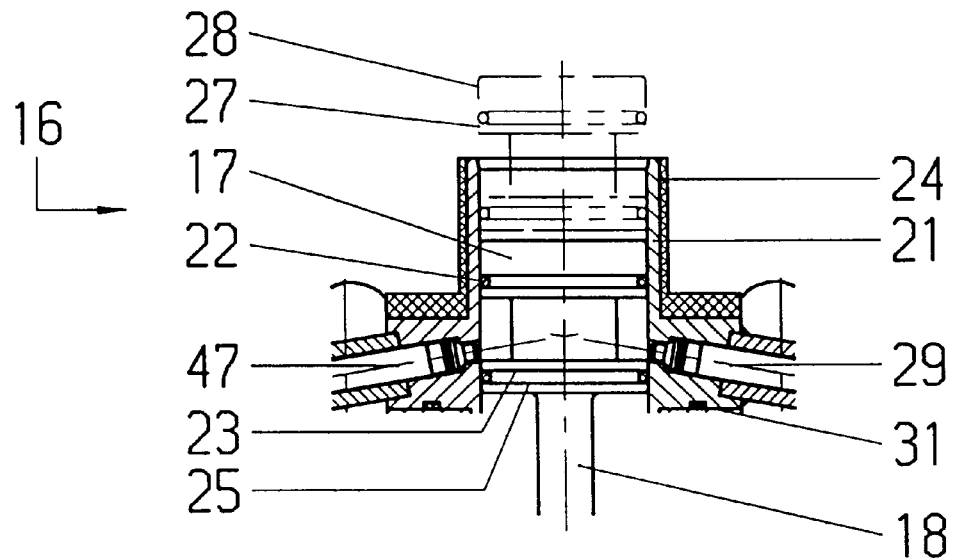
FIG. 5 is a side view of the of the upper portion of the apparatus shown in FIG. 4.

FIG. 5 shows the seating arrangement in the upper portion of the present apparatus. The flushing valve 47 and the sampling valve 29 are shown on opposite sides of the apparatus 10. The lower, sampling position 25 and the crust breaking position 27 at the top of the apparatus 10 are as indicated. The valve operating rod 18 is shown at the bottom of the figure. The disc assembly 16 here comprises the disc 17 and the top and bottom O-rings 22, 23. Also shown are the seat 21 and bushing 24.

Figure 6:
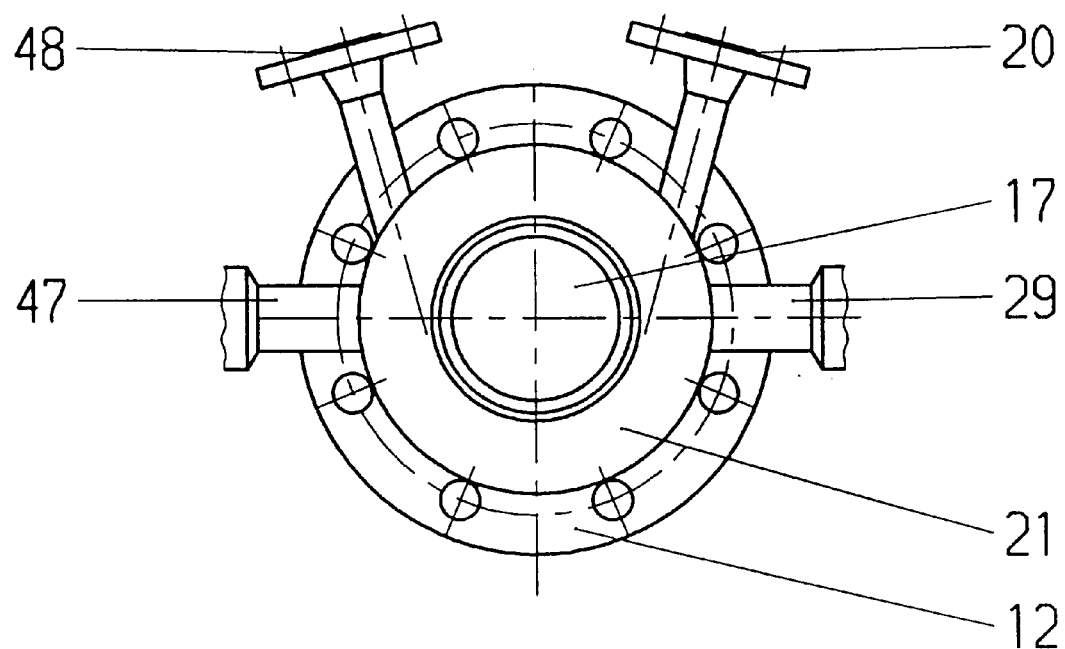
FIG. 6 is a plan view of the apparatus shown in FIG. 4, showing the disc assembly.

FIG. 6, like FIG. 3, shows the disc assembly 16. FIG. 6 is a view of the alternate embodiment shown in FIG. 4. In FIG. 6, the seat 21 holds the circular central disc 17. The sampling valve 29 and flushing valve 47 are on opposite sides of FIG. 6. A flushing port 48 is adjacent to the flushing valve 47.

The present invention can be made of any material which is compatible with the batch media. Suitable materials can include carbon steel, stainless steel, and suitable stainless steel alloys. Cast iron or carbon steel lined with PTFE/PFA, rubber or glass are also suitable materials.

The present assembly can be manufactured in various pressure ratings and sizes. Most commonly it will be used in the pressure classes ANSI 150 and ANSI 300 and in the following sizes: 3 inch×2 inch, 4 inch×3 inch, and 6 inch×4 inch or the DIN equivalents.

The present apparatus is especially useful for batch reactors in which valuable, volatile, and/or corrosive media are being processed. This type of media makes it necessary to have a tight shut-off to the process and to the atmosphere. The present valve apparatus allows for safer operation of the reactors and minimal environmental impact from the chemical processes taking place inside the reactors. The present apparatus is useful in the manufacture of, for example, pharmaceuticals, fine chemicals, agrochemicals, and other types of chemicals or chemical compositions. In addition to the draining and sampling functions, the present valve apparatus is used to retard crust formation at the bottom of the batch reactor as well as product build-up in the reactor. The present apparatus typically provides tight seating and minimal leakage to the atmosphere.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. An apparatus for sampling and draining media from a vessel or reactor, the apparatus comprising:
    (a) a valve body having a generally longitudinal axis extending therethrough and comprising a central channel, the central channel being adapted to communicate with a port in a vessel or reactor, and a side outlet which extends away from the longitudinal axis of the valve body;
    (b) a moveable disc assembly positioned within the central channel of the valve body, the disc assembly comprising a disc and two sealing rings;
    (c) a valve operating rod extending within the valve body along its longitudinal axis, the valve operating rod having an upper end communicable with the disc assembly;
    (d) a piston actuator assembly for positioning the disc assembly along the central channel, the piston actuator assembly being adapted to communicate with the valve operating rod; and
    (e) a sampling port extending away from the valve body, the sampling port being communicable at one end with the central channel and at an opposite end with a mechanism for sample collection.

2. An apparatus according to claim 1, adapted for connection to a batch reactor containing media which comprises chemicals or pharmaceuticals.

3. An apparatus according to claim 1, further comprising a mechanism for connecting the apparatus to a port in a bottom wall of a batch reactor.

4. An apparatus according to claim 3, further comprising (f) a pneumatic positioner which signals the piston actuator assembly to automatically reposition the disc assembly in the central channel.

5. An apparatus according to claim 4, wherein the disc assembly can be automatically positioned at three or four positions in the central channel for either sampling, closing off, draining, or crust breaking of the media in the batch reactor.

6. An apparatus according to claim 4, wherein the disc assembly is automatically set at a first position in the central channel below the juncture of the sampling port and the central channel for sampling the media in the batch reactor.

7. An apparatus according to claim 6, wherein the disc assembly is automatically set at a second position in the central channel above the juncture of the sampling port and the central channel for closing off media flow from the batch reactor.

8. An apparatus according to claim 6, wherein the disc assembly is automatically set at a third position above a second position in the central channel for breaking any crust formed by media in the batch reactor.

9. An apparatus according to claim 8, wherein the disc assembly is automatically set at a fourth position which is above the third position and which permits media to drain from the batch reactor down the central channel to the side outlet.

10. An apparatus according to claim 9, wherein the side outlet is communicable with a mechanism for collecting the drainage from the batch reactor.

11. An apparatus according to claim 9, wherein the disc assembly comprises two O-rings, one of which is above the disc and the other of which is below the disc.

12. An apparatus according to claim 11, further comprising four proximity limit switches, each of which indicates one of the four different positions of the disc assembly along the central channel.

* * * * *